US009594856B2

(12) United States Patent
McDaniel

(10) Patent No.: US 9,594,856 B2
(45) Date of Patent: Mar. 14, 2017

(54) SYSTEM AND METHOD TO EMBED BEHAVIOR IN A CAD-BASED PHYSICAL SIMULATION

(75) Inventor: Richard Gary McDaniel, Hightstown, NJ (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1455 days.

(21) Appl. No.: 12/766,416

(22) Filed: Apr. 23, 2010

(65) Prior Publication Data

US 2010/0274535 A1 Oct. 28, 2010

Related U.S. Application Data

(60) Provisional application No. 61/172,918, filed on Apr. 27, 2009.

(51) Int. Cl.
*G06F 17/50* (2006.01)
*G06G 7/48* (2006.01)

(52) U.S. Cl.
CPC ...... *G06F 17/5009* (2013.01); *G06F 2217/04* (2013.01)

(58) Field of Classification Search
CPC .................. G06F 17/5009; G06F 2217/04
USPC .......................................... 703/1, 6
See application file for complete search history.

(56) References Cited

U.S. PATENT DOCUMENTS

| 6,360,357 | B1* | 3/2002 | Cesare ................. 717/168 |
| 6,714,201 | B1* | 3/2004 | Grinstein et al. ......... 345/474 |
| 7,672,822 | B2* | 3/2010 | Lee et al. ................. 703/7 |
| 2006/0212821 | A1* | 9/2006 | Charles et al. ............. 715/764 |
| 2007/0013709 | A1* | 1/2007 | Charles et al. ............. 345/581 |
| 2008/0010041 | A1 | 1/2008 | McDaniel |
| 2010/0262930 | A1* | 10/2010 | Helbling et al. ............. 715/771 |

OTHER PUBLICATIONS

PCT International Search Report mailed Feb. 10, 2012 corresponding to PCT International Application No. PCT/US2010/032365 filed Apr. 26, 2010 (15 pages).
Jinseok Seo, et al.; Design for Presence: A Structured Approach to Virtual Reality System Design; vol. 11, No. 4; pp. 378-403; 2002; Korea; (26 pages).

* cited by examiner

*Primary Examiner* — Aniss Chad
*Assistant Examiner* — Juan Ochoa

(57) ABSTRACT

A system, method, and computer readable medium. A method includes receiving a geometric object and corresponding physical object for a CAD model. The method includes executing function code in a behavior object to determine required references of the behavior object. The method includes receiving and storing an assignment of at least one of the required references of the behavior object to the physical object, and storing the geometric object, physical object, and behavior object in the data processing system as associated with the CAD model. The method includes simulating operation of at least part of the CAD model, including executing the behavior object to modify the state of the physical object.

21 Claims, 9 Drawing Sheets

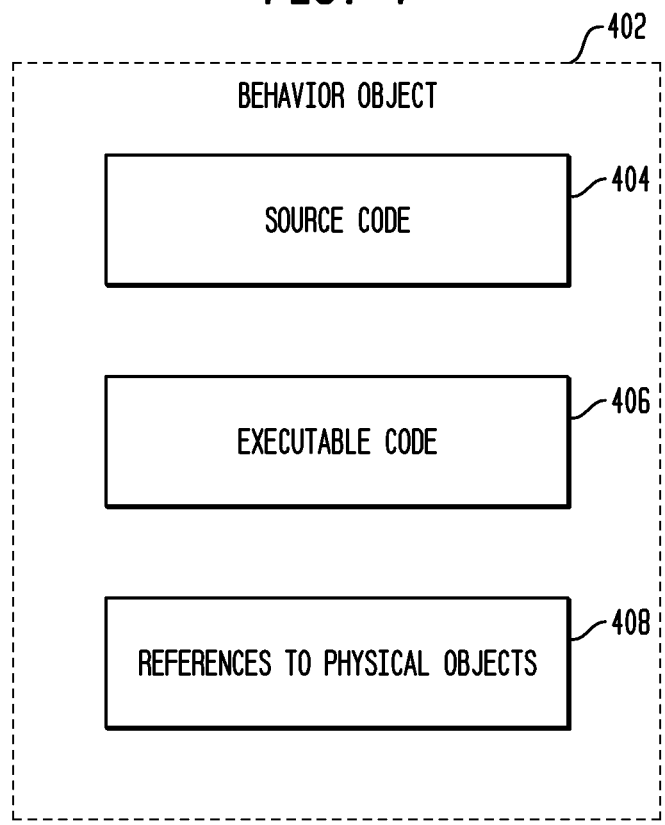

FIG. 5

```
import RuntimeLib;
namespace MyBehavior{
    public class UserAction : RuntimeLib.BehaviorObject{
        private RuntimeLib.RigidBody box;                              RUNTIME      /502
        private RuntimeLib.TriggerBody sensor;                         REFERENCES public override void Define (DefContext context) {
            context.MapRuntimeObject (box);                            BEHAVIOR     /504
            context.MapRuntimeObject (sensor);                         DEFINITION
        } public override void Invoke (float time) {
            if (sensor.GetIntersects ().size()>0){
                box.ApplyTorque (Math.vector (0,0,15.0));              BEHAVIOR     /506
            }                                                          INVOCATION
        }
    };
}
```

SYSTEM AND METHOD TO EMBED BEHAVIOR IN A CAD-BASED PHYSICAL SIMULATION

CROSS-REFERENCE TO RELATED APPLICATIONS

This application claims the benefit of the filing date of U.S. Provisional Patent Application 61/172,918, filed Apr. 27, 2009, for "Method to Embed Behavior in a CAD-Based Physical Simulation", which is hereby incorporated by reference.

TECHNICAL FIELD

The present disclosure is directed, in general, to systems and methods for use in computer-aided design, manufacturing, engineering, prototype/test, maintenance, modeling, and visualization (individually and collectively, "CAD" and "CAD systems") and in product lifecycle management ("PLM") and other systems.

BACKGROUND OF THE DISCLOSURE

Many manufactured products are first designed and modeled in CAD systems, and PLM systems are used by manufacturers, retailers, customers, and other users to manage the design, use, maintenance, and disposal of various products. Improved systems are desirable.

SUMMARY OF THE DISCLOSURE

Various embodiments include a system, method, and computer readable medium. A method includes receiving a geometric object and corresponding physical object for a CAD model. The method includes executing function code in a behavior object to determine required references of the behavior object. The method includes receiving and storing an assignment of at least one of the required references of the behavior object to the physical object, and storing the geometric object, physical object, and behavior object in the data processing system as associated with the CAD model. The method includes simulating operation of at least part of the CAD model, including executing the behavior object to modify the state of the physical object.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 4 depicts an example of the content of a behavior object, in accordance with various embodiments;

FIG. 5 depicts an example of source code for a behavior object having a structure in accordance with various embodiments;

DETAILED DESCRIPTION

Figure 1:
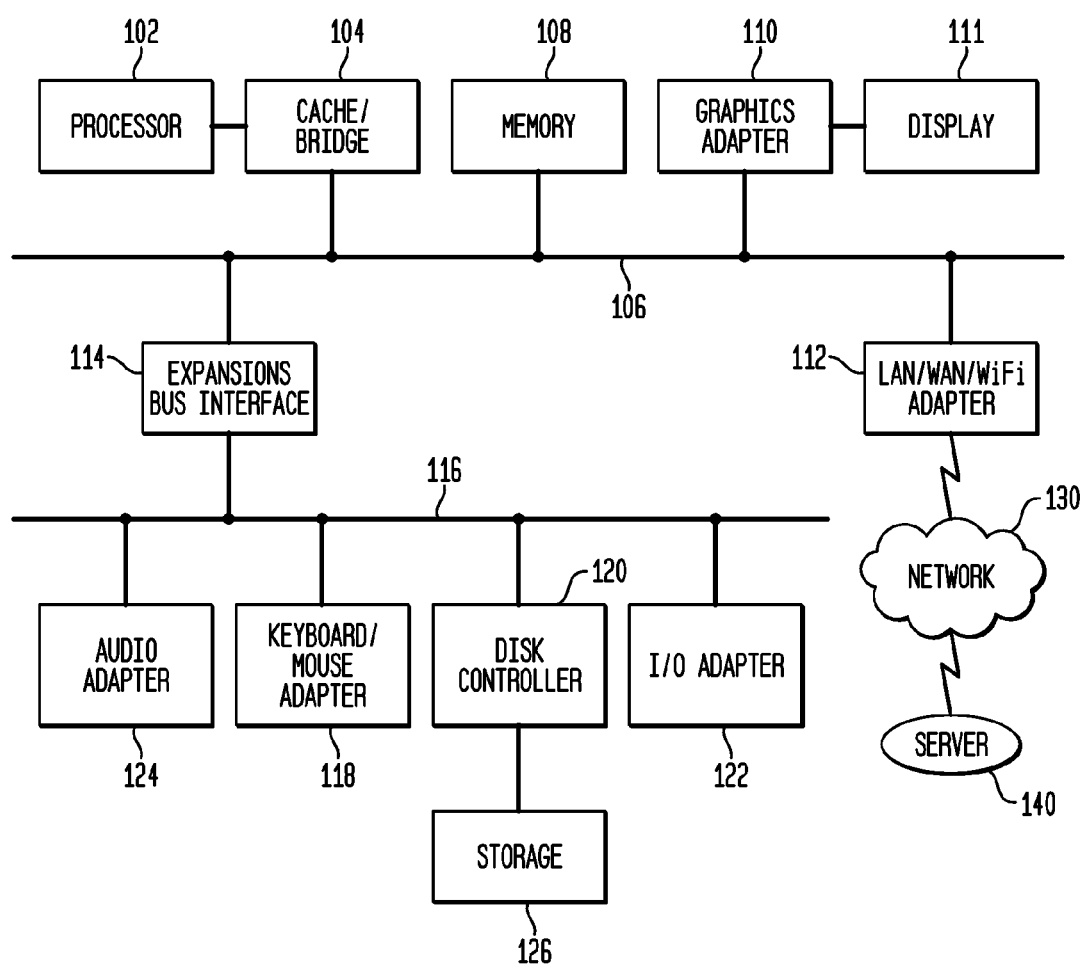
FIG. 1 depicts a block diagram of a data processing system in which an embodiment can be implemented in accordance with disclosed embodiments.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

CAD systems and applications can be used for visualization and simulation of objects, assemblies, and products. Many different simulation processes such as dynamics and kinematics are used to manipulate objects in a virtual environment based on the three-dimensional geometry modeled using CAD. These environments are used to design and test machines, test pilot vehicles such as ships and airplanes, and for entertainment purposes such as video games.

CAD modeling can be combined with physical parameterization to create simulations. There are many different ways to provide editing dialogs and ways to architect physics-based objects in a CAD application in order to animate the geometric objects so that they appear to behave physically. The simulation can be computed in real-time interactively or it can be computed off-line, saved to persistent storage, and then loaded and re-played for analysis. The system interacts with a user to enable the user to create the various objects described herein. The physics-based objects are created in addition to the geometrical objects. Different kinds of physical objects are created depending on the kind of simulation the user is performing.

The objects specified for the simulation have a runtime behavior that calculates how the modeled objects evolve over time, and can generally include notions of time, state, and behavior. The runtime behavior and the objects used to compute the runtime behavior, in principle, only exist when the simulation is in the process of being calculated. In an off-line calculation, the runtime behavior is what creates the results of the simulation that are stored for later viewing. In an interactive simulation, the runtime behavior exists concurrently with the display of the results. Sometimes, the runtime system will define dynamic objects that are analogous to the persistent objects the user provides to specify the semantics of the simulated behavior. Modifying the state of runtime objects will change the state of the simulation and the solver's future calculations but will not impact the properties of the original persistent objects.

The behavior of the simulation depends on the objects the user defines. The objects denote the semantics of the simulated behavior and different combinations of objects will perform different functions. In current CAD environments, these objects are limited and have specific semantic functions. The objects do not provide the kind of semantics needed to create arbitrary programmed behavior such as provided by a programming language. The user cannot program any arbitrary desirable behavior and is limited to the semantics provided by the given objects.

In some systems, physical objects constitute the primary behavioral semantics supplied by the application, and do not include means to supply control behavior such as sequencing, testing for conditions, and applying changes to the runtime state based on those tests. Some systems permit linkage to external applications, but these are not integrated into the CAD system and cannot be controlled efficiently. Some systems allow limited behavior programming through built-in, custom graphical languages such as sequence chart programs. These systems are currently not able to perform dynamics simulation such as rigid body motion. Instead, they are used to create animated motion based on keyframe positions. These custom languages also cannot be used to create event-based, reactive programs whose behavior depends on situations that occur during simulation.

Disclosed embodiments provide significant advantages over known systems, including by embedding behavior data in CAD objects for use in simulation.

FIG. 1 depicts a block diagram of a data processing system in which an embodiment can be implemented, for example as a CAD or PLM system configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus.

Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Some systems create a simulation by using a dedicated programming language or a programming library in a standard language. These kinds of systems are not directly integrated with a CAD system and run independently. In one such system, nodes, representing functions, are connected in series to produce computations. Such a system uses a two-dimensional graphical user interface languages where the user collects and assembles the nodes into simulations. In other cases, the system can use a programming library such as the OPEN DYNAMICS ENGINE (ODE) open-source programming library. The programmer creates a simulation using the C programming language and by linking in the ODE library. In both cases, any relationship to a three-dimensional graphical visualization is set up manually by the user. The simulation system is not an integral part of the CAD package or geometric modeling tool.

For the programming library solution, the user programs all simulation behavior using a programming language like C. Since the user programs aspects of simulation behavior manually, there is no restriction on the kinds of behaviors the user may produce. However, such a system is not part of a CAD-based simulation application since there is no CAD. Any integration to a CAD system would be contingent on the user to generate. A user can manually program arbitrary simulation behaviors, but there is no relationship to CAD-based simulation. Any connection to CAD in most systems must be created manually by the user.

Some CAD-based simulation systems operate over a limited duration of simulated time, such as by using a fixed-length table, to produce a finite solution. The user selects how many time steps the solver will run before starting the solver. All functions and property values are arranged to be valid only over that limited time duration and are not generally applicable to an unbounded simulation calculation. For example, the user may provide a spreadsheet table to the solver to specify the values of forces that are applied to a given object at different times. The table is a finite list of values that does not change while the simulation is running.

Figure 2:
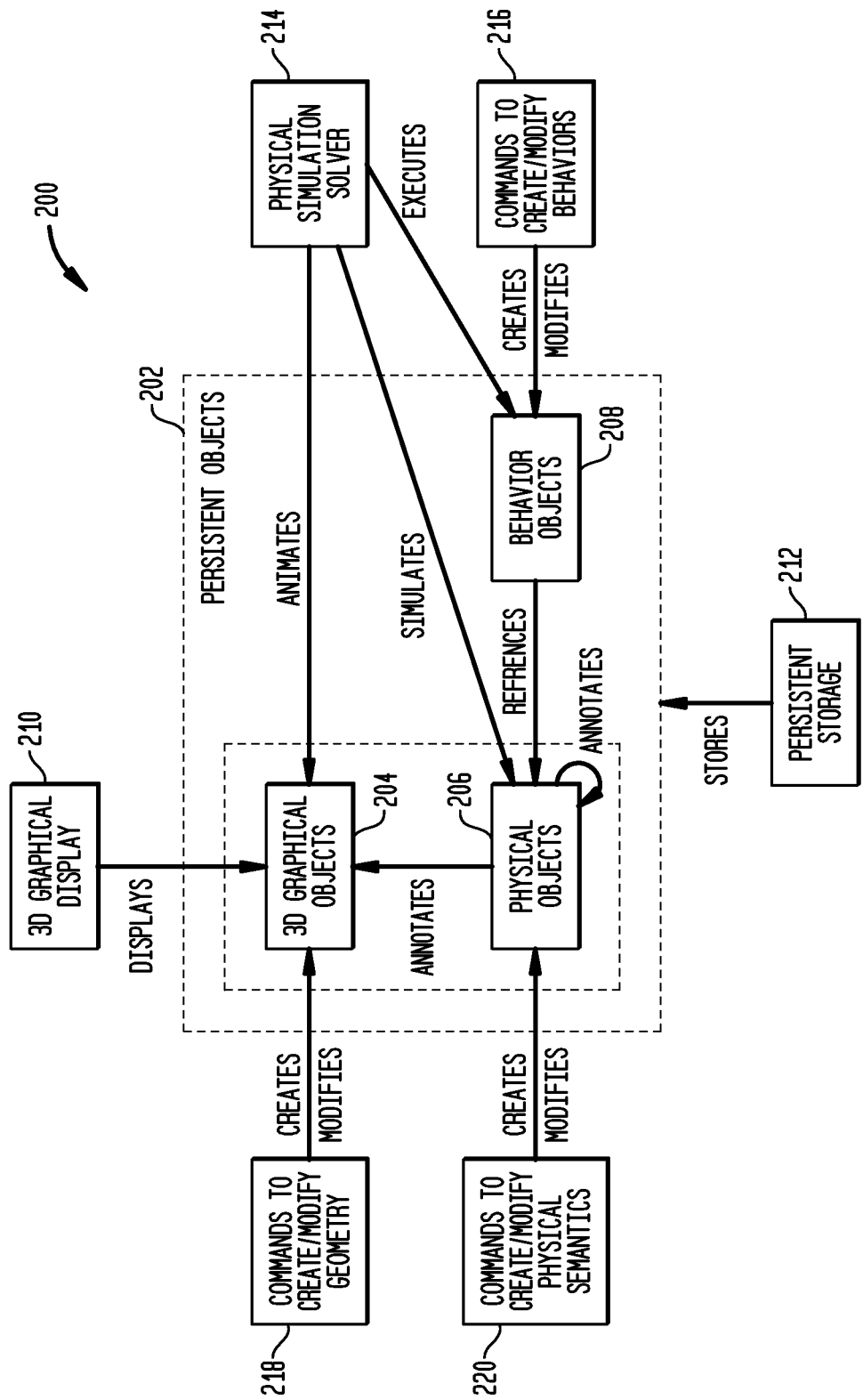
FIG. 2 shows a high-level overview of the fundamental parts and interactions of a system in accordance with disclosed embodiments.

FIG. 2 shows a high-level overview of the fundamental parts and interactions of a system 200 in accordance with an embodiment disclosed herein. Such a system can be implemented, for example, in data processing system 100. The kinds of objects that the user creates and modifies are shown in the center of the figure. Around the periphery, commands and services that create, manipulate, or otherwise affect the objects are shown.

In such a CAD application, in general, the user draws geometric objects using commands or other interactions with the system. CAD applications provide a graphical user interface and immediate feedback using a three dimensional display such as display 210. To specify a simulation, the user annotates the geometric objects 204 with physical objects 206 that are semantically linked to physical behaviors. For example, objects can be specified to move; have mass; be able to collide with one another; be linked to one another through constraints; and so forth. The kind of semantic objects the system provides depends on the solver that computes the simulation behavior.

Disclosed embodiments include systems and methods to define programmatic behaviors in a CAD-based simulation. The user can create and modify the persistent objects 202, including 3D geometric objects 204 and physical objects 206. Physical objects 206 can annotate the 3D geometric objects 204 and recursively annotate the physical objects 206. The user can also create and modify behavior objects 208. Behavior objects 208 reference the physical objects 206, and can also be maintained as persistent objects 202. Commands 216 can be used to create and modify the behavior objects 208 and perform other CAD tasks. Commands 218 can be used to create and modify the geometric objects 204 and perform other CAD tasks. Commands 220 can be used to create and modify the physical objects 206 and perform other CAD tasks. The behavior objects 208 are thereby embedded in the CAD application and/or model in that that the programmed behavior is directly nestled in the CAD application's own data structures and is not separate from the CAD application.

Display 210 can be used to display the CAD environment, simulations, and user interactions, among others, using the persistent objects 202. Persistent storage 212 can store the persistent objects 202 along with other data on a temporary or permanent basis.

A physical simulation solver module 214 can be used to execute behavior objects 208, simulate physical objects 206, and animate 3D geometric objects 204.

One purpose of a CAD application as disclosed herein is to define and edit three-dimensional shapes that can later be used to specify the development of physical devices. A CAD application can be developed as a graphical user interface that interactively presents the 3D shapes to the user as they are being edited. Disclosed CAD applications provide further services than developing 3D geometry, though. In particular, a CAD application can provide physical simulation of the objects.

Objects in FIG. 2 that correspond to CAD functions include the 3D geometric objects 204. User interface commands 214 are used to create and modify these geometric objects so that they take on the geometric shape of the devices being modeled. The 3D graphical display 210 presents these objects to the user as the editing occurs. Physical objects 206 are added to the system and describe the physical qualities of the geometric objects. The physical objects 206 represent physical behaviors such as movement, collision, connections, mass, velocity, force, and other concepts. Physical objects 206 are tied to geometric objects 204 and to other physical objects through annotations. The annotations denote which geometries are affected by the various physical behaviors. The user can create and modify physical objects using commands 220. The commands 220 can be part of the same user interface used to create geometric objects. Physical objects 206 can also appear in the graphical display 210 along with or separately from the geometric objects they annotate.

In various embodiments, simulation is accomplished using the physical simulation solver module 214 that reads in the physical objects 206 that the user creates and uses them to generate a sequence of state changes representing physical activity. The state of the simulation solver module 214 is initialized based on the physical objects 206 and then performs the actual solving. When the solver is running, it is in its "runtime" state. The runtime state is special because the state of the simulation evolves over time. The changes in simulation state can then be presented to the user by animating the geometric objects 204 so that they appear to move as though they were real-world objects interacting with one another. In other cases, the system may also animate the 3D representations of any physical objects.

Disclosed embodiments include techniques for embedding a general programming capability into a CAD-based simulation application. The programs are stored as behavior objects 208 directly with the other persistent objects 202 as shown in FIG. 2. Various embodiments allow the user to create as many behavior objects 208 as needed. Behavior objects can hold executable code. They can include the source for generating the code and/or the executable object code itself. When the behavior object 208 holds source, the system will preferably include a compiler or other means to compile the source into an executable format. All persistent objects 202 can be managed by the CAD systems persistent storage device 212 and can be saved and restored with all linkages and properties.

The physical simulation solver module 214, in various embodiments, can execute the functions of the behavior objects 208 as well as provide the execution of the semantic behavior of physical objects 206.

Figure 3:
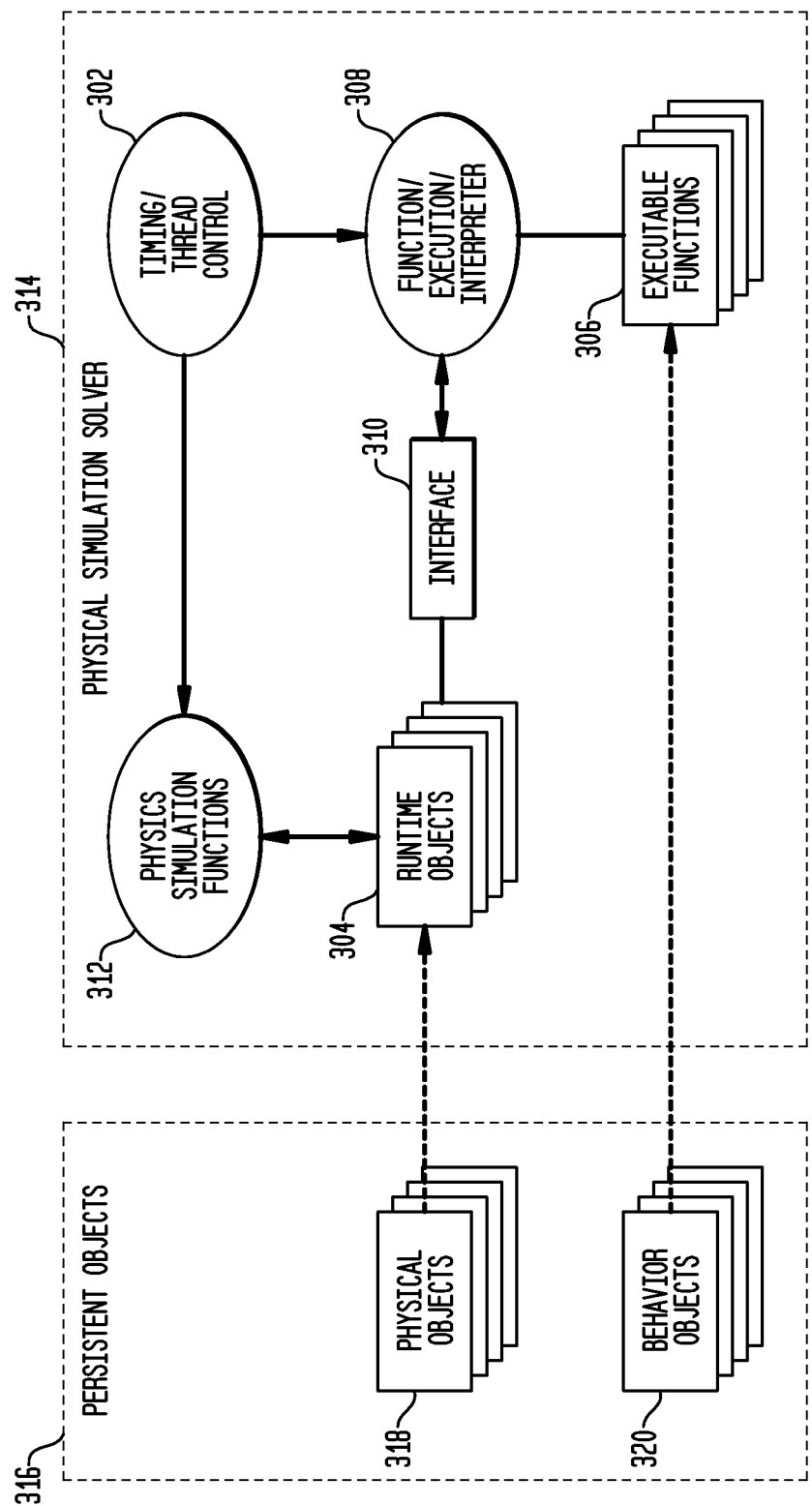
FIG. 3 shows some components of the physical simulation solver module and its relation to persistent objects and other related objects in accordance with various embodiments.

FIG. 3 shows some components of a physical simulation solver module 314 and its relation to persistent objects 316 and other related objects in accordance with various embodiments. The solver module 314, in some embodiments, generally functions as an execution environment, meaning it has some kind of thread of execution or process control. This aspect is represented as the timing/thread control circle 302. Execution can be broken into discrete time steps representing the passage of some amount of time.

One purpose of the simulation solver module 314 is to represent and compute the physical scenario described in the CAD objects and determine what they do, and generally execute a simulation as described herein. To do this, the persistent physical objects 318 are converted to runtime objects 304 as shown in FIG. 3. The conversion process need not be one-to-one, but in general, the persistent physical objects 318 are used to generate the runtime objects 304 and set their initial values. The runtime objects 304 hold the state of the simulation as the solver 314 computes the behavior for each simulation step. The runtime objects 304 hold the current simulation state, physics simulation functions 312 can then modify the state variables by computing what happens during the current time step. The updated runtime objects 304 are then used as the input for the computation of the next time step and this continues until the simulation is halted.

In addition to the runtime objects 304, various embodiments also include executable functions 306 in the physical simulation solver 314. The executable functions 306 are derived from the behavior objects 320 created in persistent storage as shown in FIG. 3. The executable functions 306 are loaded into a function execution/interpreter system 308. The difference between an executable function and a behavior object, in some embodiments, is effectively the same difference as a program that is running on a computer versus an unloaded program that is available on the computer's disk drive. The function execution/interpreter system 308 can include a standard software library such as the Common Language Runtime library from Microsoft. The physical simulation solver 314, its function execution system 308, and other elements can also be associated with a hardware device such as controllers and/or microprocessors. The timing/thread control aspect 302 of the physical simulation solver 314 preferably has access to the function execution/interpreter system 308 and can direct what executable function to process and when it should be processed.

The executable functions 306 have access to the state of the runtime objects through a programming interface 310 as shown in FIG. 3. Since, in various embodiments, the function execution/interpreter 308 is performing the actual execution, the arrow to and from the runtime objects interface 310 is shown attached to it, but it is the code in the executable functions that spells out what state to create, delete, access, and/or modify and when. By modifying the runtime objects 304, the executable functions 306 can affect the course of the simulation. The functions can add and remove objects, detect when certain states and configurations of the objects occur, and otherwise manipulate the state to perform operations the physical objects might not specify by themselves.

In general, the interface 310 to the runtime objects 304 can be a library interface to the physical simulation solver 314 as a whole. The physical simulation solver 314 can supply methods and state variables that are accessed through the interface 310. The implementation of the interface 310 depends on the implementation of the function execution/interpreter 308. Some execution libraries allow the calling environment to register routines that can respond to calls from the environment. Other execution libraries use dynamic library interfaces to call functions in the dynamic library. The calling environment in that situation provides library functions in a dynamic library that the execution environment calls to gain access to the application environment. Whatever interface mechanism is used, the function execution/interpreter 308 can access and share information with the physical simulation solver 314 and call functions with parameters and get back results. The functions can also be used to control attributes of the physical simulation solver besides the runtime objects such as changing global variables, affecting the timing, and detecting events.

Because behavior objects are persistent objects, a user of a system as disclosed herein has the ability to create and edit behavior objects within the CAD system interface. A new behavior object can be created by the system in response to a user interface command. The system then loads the behavior object with the program that defines the executable function behavior, as indicated by a user.

FIG. 4 depicts an example of the content of a behavior object 402, in accordance with various embodiments, that can correspond to one of behavior objects 208. The contents include the source code 404 for a given behavior program, the executable code 406 corresponding to the source, which is typically derived from compiling the source, and a list of references 408 to physical objects that the behavior code may examine or modify during runtime. The source code can be left unspecified if the user wishes to compile the source in another tool and have the system load the executable version directly. The user can also cause the system to purge the source leaving only the executable as a way to hide the implementation of a behavior object.

In principle, a behavior object 402 can hold any kind of executable program. A program derived from a standard textual programming language is a reasonable choice because it provides a convenient, well-known notation with available libraries for embedding execution in the CAD application. The program can also consist of a custom language such as provided by a dataflow diagram or some other graphical or textual language. There can be many behavior objects created and the code in each behavior object can be independent of the code in all the other behavior objects.

The kinds of commands that can be applied to behavior objects include:
Create Behavior Object
Delete Behavior Object
Load source code
Compile source code to executable code
Load executable code directly (empty source)
Use dialog(s) to edit source code
Add reference to physical object
Remove reference to physical object Various embodiments impose a structure on the behavior object's program in order that the derived executable functions have access to the runtime object state and so that the user interface of the behavior object provides dialog information for the user. The code has three portions in the current embodiment: a list of runtime reference objects; a behavior definition method; and a behavior invocation method.

FIG. 5 depicts an example of source code for a behavior object having a structure in accordance with various embodiments. In this case, the code is being defined using C# but other languages including graphical languages would also be suitable. Besides the three behavior object portions, the code can also have other portions needed for its definition. The user includes a library called "RuntimeLib" at the head. This library provides access back to the application interface. The library defines all the runtime definitions upon which the behavior object's code can work. The user defines a class subclassed from the BehaviorObject class defined in RuntimeLib. By using this class, the system knows that code is actually defining the behavior code and not something else. Other means for recognizing the behavior code could include special syntax; code demarcated by keywords; graphical formatting; graphical markers like boxes, arrows, and colors; etc.

The runtime reference portion 502 of the behavior code defines the list of objects that the user wants the behavior to manipulate. These correspond to the runtime objects held in the physical simulation solver. The interface between the function execution/interpreter and the runtime objects allows the behavior code to refer to runtime objects using the structure of the physical objects. In the example, the user defines a reference to a rigid body and another to a trigger body. These types correspond to the types available for creating physical objects. For the purposes of this disclosure, the actual semantics of the rigid body or trigger body is not important. It is only important that the kinds of objects being defined are meaningful in the context of running the physical simulation solver.

The behavior definition portion 504 of the behavior code is used to register the desired runtime object references with the system. Here the user's code calls the system library so that the system library populates the code's reference variables with values. If the system is using another style of behavior programming, this portion of the code could be performed automatically depending on the language's features. The important aspect of this method is that it can be executed independently of the invoke method described next.

The behavior invocation portion 506 of the behavior code is used to perform the runtime object manipulations that the user intends the behavior to do. Here the references to runtime objects are used to read and modify runtime state. The method can also create or delete runtime objects using the referenced runtime objects as prototypes. In the example in FIG. 5, the invoke method implements the behavior invocation portion of the behavior code. It reads the current state of the sensor object and uses it to modify the state of the box object.

The disclosed systems can also allow the behavior code to define more kinds of methods to handle more kinds of events. For example, the behavior code can define methods:

Start—is called when the physical simulation solver is first started.

Stop—is called when the physical simulation solver is cancelled or otherwise stops.

Pause—is called when the system receives a "pause" command, such as the user pushing a pause button in the application user interface, causing the physical simulation solver to temporarily stop running or resume from the paused state.

Error—is called when some part of the application produces an error condition.

Figure 6:
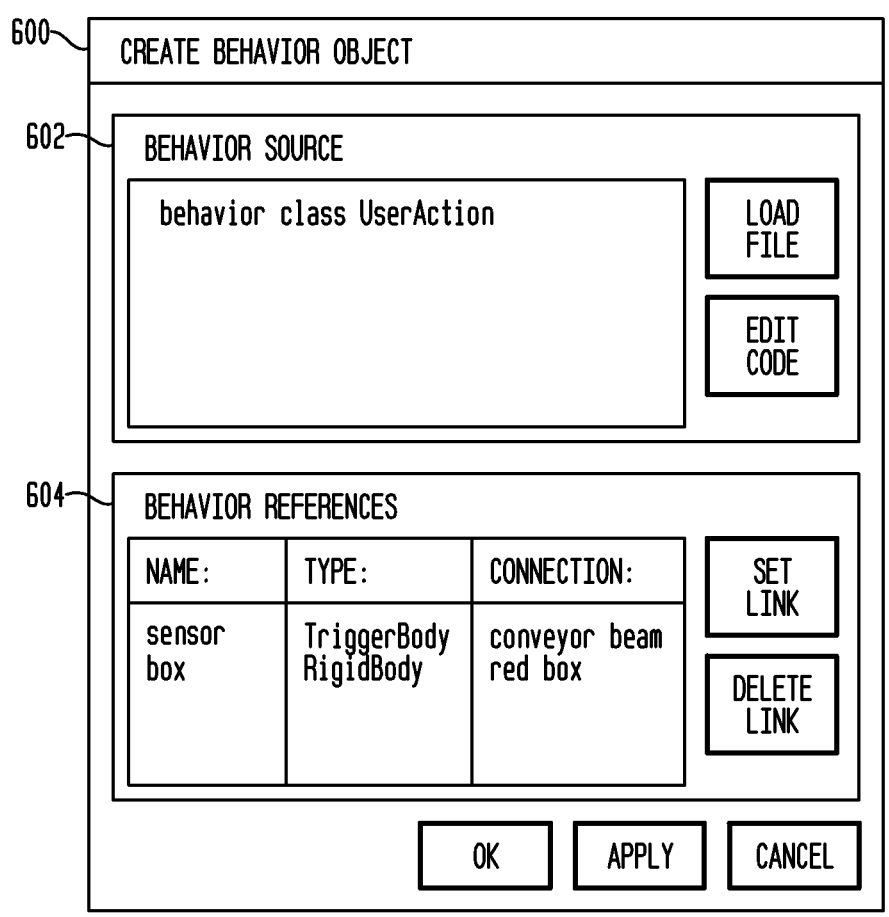
FIG. 6 depicts an example of a behavior object dialog in accordance with disclosed embodiments.

Various disclosed embodiments can use a graphical user interface dialog to allow the user to create and edit behavior objects. FIG. 6 depicts an example of a behavior object dialog in accordance with disclosed embodiments, as might be displayed to a user. The dialog has two sections: a behavior source area 602 for loading, inspecting, and editing the behavior code, and a behavior references area 604 for linking the elements of the runtime reference specification to physical objects.

The way the behavior object dialog works, in some embodiments, can summarized with reference to the example of FIG. 6. The system receives the user specification of what behavior code to load into the behavior object, for example by the user pressing the load file button. The behavior code can be source code such as the textual example shown in FIG. 5. The behavior code can also be loaded as a pre-compiled executable function in which case the source is left empty.

Figure 7:
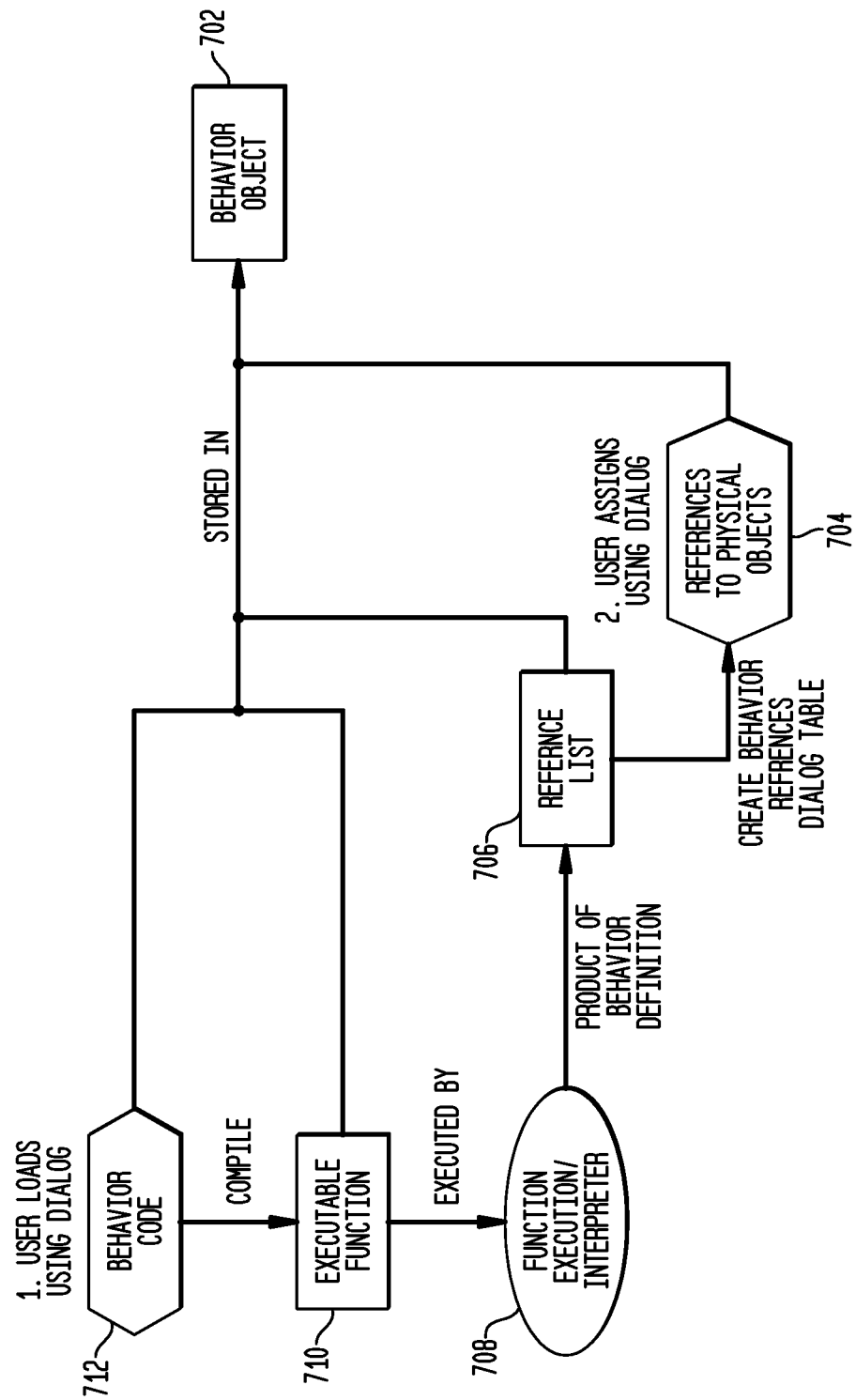
FIG. 7 illustrates various elements of disclosed systems and methods, in accordance with disclosed embodiments.

If the user loads source, the system compiles the source behavior code into an executable function as shown in FIG. 7 The behavior object dialog 600 has the ability to execute the executable function using the same function execution/interpreter library as is used by the physical simulation solver. The system uses the function execution/interpreter to search for blocks of code where a behavior is defined, in order to fill out the contents of the behavior source section. It is possible to have multiple behaviors defined in a single behavior code definition. For example, using the format shown in FIG. 5, the user can define multiple classes derived from the library-defined BehaviorObject superclass. The behavior object dialog lists the names of all the behavior-defining blocks in the behavior source area 602 as shown in FIG. 6. The user can view and edit the behavior source code by pressing the edit code button.

The system executes the behavior definition portion of the behavior code so that it will register the runtime references that are requested. In this initial execution, the system can build a runtime reference list that indicates which physical object references are required for execution of the behavior object. Each element of the runtime reference list notes the type of physical object required and can have other information such as a name. The list of runtime references is presented to the user in the behavior object dialog in the behavior references area 604 shown in FIG. 6. In the example, the name and type fields of the behavior references table would be filled out by the system.

The system presents the list of runtime references to the user, and enables the user to assign physical objects to each entry in the list of runtime references. The user can select which physical object to assign by selecting a row of the table and pushing the set link button shown in FIG. 6. The user can then select a physical object from the main application to be assigned to that row. The user may select any physical object in the application whose type matches the type expected by the runtime reference entry. The user may remove an assigned physical object by pushing the delete link button. Of course, any appropriate user interaction can be used, in various embodiments, for the system to receive the user's assignment of physical objects to the runtime references.

FIG. 7 illustrates various elements of disclosed systems and methods, and how they are created and stored, in accordance with disclosed embodiments. As shown in FIG. 7, the references to physical object 704, the structure of the reference list 706 itself, the executable function 710, and the behavior code 712 are all stored in the behavior object 702. All of these are part of the behavior object's data as shown in FIG. 4.

The behavior code 712 can be stored in the behavior object 702 and is compiled into executable function 710, also stored in behavior object 702. The executable function 710 is executed by the function execution/interpreter 708, to produce behavior definition and reference list 706 that are stored in behavior object 702. Reference list 706 is used to create the behavior reference dialog table, and the system uses these dialogs to interact with a user to receive the references to physical objects that are also stored in the behavior object 702.

Activating the physical simulation solver, in disclosed embodiments, causes the timing/thread control to run that, in turn, executes functions in the physics simulation functions and the function execution/interpreter. In order to ready the behavior objects to be used as executable functions, the system must set up the interface between the runtime objects and the function execution/interpreter.

As described above, the system creates runtime objects based on the set of physical objects as shown in FIG. 4. The executable functions are derived from behavior objects and each behavior object holds a list of references to physical objects.

Figure 8:
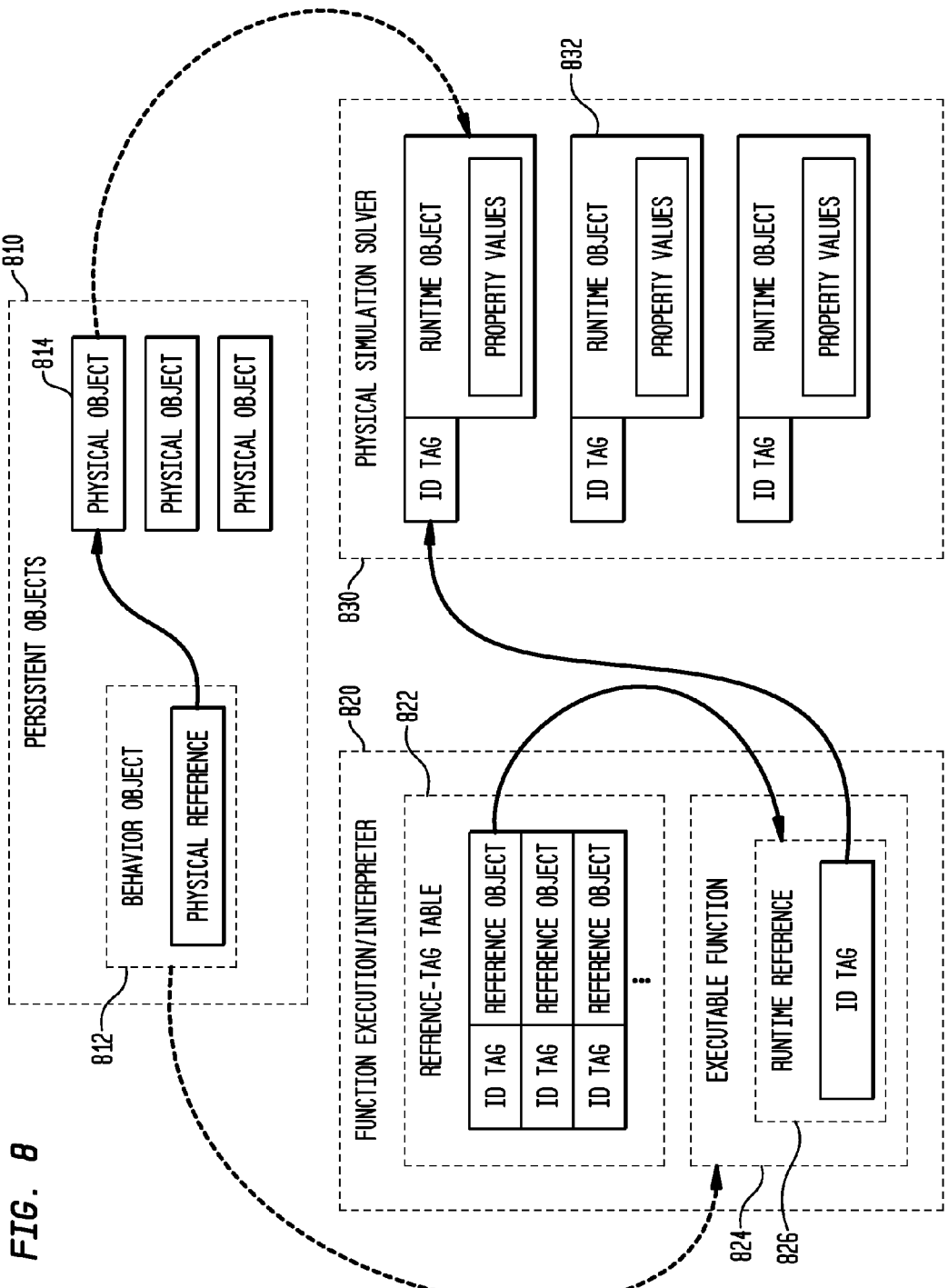
FIG. 8 shows an example where a behavior object holds a reference to a physical object in accordance with disclosed embodiments.

FIG. 8 shows an example where a behavior object holds a reference to a physical object. Shown here are persistent objects 810 including behavior object 812 that has physical reference to physical object 814. The function execution/interpreter 820 includes a reference-tag table 822 that points to the runtime reference 826 of executable function 824. The runtime reference 826 includes one or more id tags that correspond to the id tags of runtime objects 832 of the physical simulation solver 830. The physical objects 814 of persistent objects 810 can also reference the runtime objects 832.

The interface between the runtime objects 832 and the executable functions 824 is enabled by mapping each physical object reference in the behavior object to a corresponding runtime object reference 832 for the executable function 824.

As in any programming system, the data entities that constitute the runtime objects in the physical simulation solver can be distinguished from one another. One method is to store a pointer to the object's data. Another method can be to associate the object with a unique tag. A set of runtime objects with their identifying markers displayed as an id tag are shown in FIG. 8. When the system creates a runtime object, it tracks from which physical object it is derived. When the system loads the executable function into the function execution/interpreter, it stores id tag values into the runtime reference variables. The id tag stored in the runtime reference is equivalent to the id tag of the runtime object derived from the physical object whose reference was stored in the behavior object. The system can thereby use the mapping from physical object to id tag to replace the references to physical objects in the behavior objects with the corresponding id tag in the executable function.

When the physical simulation solver is running, the behavior invocation portion of executable function shown in FIG. 5 is executed. The behavior invocation portion's code uses the values of id tags to access and modify the property values of runtime objects. The interface between the function execution/interpreter and the physical simulation solver exchanges id tag values. The runtime object with the corresponding id tag will be the one accessed or modified. The changes to the runtime objects then propagate to the physical simulation functions to make the simulation behavior change. This is how the code in the behavior object causes simulation behavior to occur.

The id tags of runtime objects can be used to access and modify runtime object state, but it can also be used to navigate the runtime object structure of the simulation. The state of the runtime object property values can contain id tags as values. The results of some interface library methods may also provide id tags as results. When the executable function retrieves an id tag as a result, it can use the id tag to access and modify the runtime object to which it refers. The runtime object need not be one that was originally listed in the set of runtime references. The system encapsulates id tags into runtime reference objects upon which the executable function can call methods. If the id tag refers to a runtime object that was not a member of the set of runtime references, the system allocates a new runtime reference object to encapsulate the id tag. The executable function can use any runtime reference object during the course of its execution using all applicable methods. To keep track of all runtime reference objects, the system keeps a reference-tag table 822 in the function execution/interpreter environment 820 that is shown in FIG. 8. The table keeps a list of all id tags currently being used by the executable function and the runtime reference objects that encapsulate them. When the executable function retrieves an id tag to a runtime object it is already using, the system re-uses the same runtime reference object it allocated before. Retrieving a new id tag causes the system to add a new entry to the table. Table entries can be eliminated through garbage collection methods or by calling a delete method on the table. The id tags and reference objects of the original runtime references specified by the behavior definition portion of the behavior code are stored in the reference-tag table as every other runtime reference.

Figure 9:
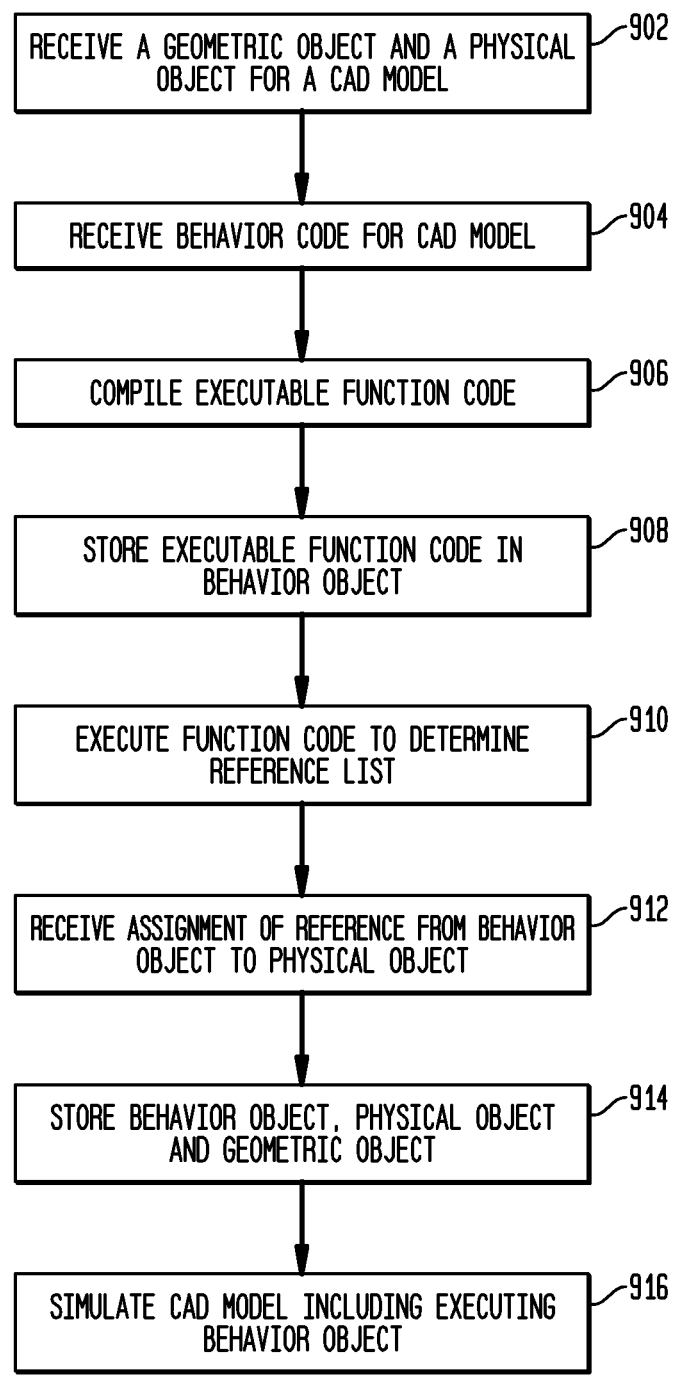
FIG. 9 depicts a flowchart of a process in accordance with disclosed embodiments.

FIG. 9 depicts a flowchart of a process in accordance with disclosed embodiments, for managing behavior of objects of a CAD model in a data processing system. In various embodiments, various steps may be omitted, performed in a different order, or performed concurrently. Note that in the process discussed below, behavior objects, physical objects, and geometric objects are described as associated with or corresponding to other objects. Of course, in any given implementation, there may be other objects that do not participate in the process described below, and so may not be associated with another object as described.

The system receives a geometric object and a corresponding physical object for the CAD model (step 902). As used herein, receiving can include loading from storage, receiving from another system over a network or otherwise, or receiving via an interaction with a user.

The system receives behavior code for the CAD model that references the physical object (step 904). This step can include, but is not limited to, receiving customized behavior code from a user. The behavior code can include arbitrary, user-written code. In some cases, user-customized behavior code defines a behavior modification for a specified type of physical object, and enables a user to specify the specific physical object(s) that the behavior will modify.

The system compiles the behavior code into executable function code (step 906). Of course, in other embodiments, steps 904 and 906 can be performed separately, so that the executable function code is directly received into the CAD object.

The system stores executable function code in a behavior object that references the physical object (step 908).

The system executes the executable function code to determine a reference list of required behavior references (step 910). The required behavior objects can be implemented as a reference list that includes the name and type of behavior references for the behavior object. Of course, the term "list" is not intended to limit this to a specific data structure, and any appropriate data structure can contain the required behavior references.

The system receives and stores an assignment of a reference from the behavior object to the physical object (step 912). In some embodiments, this step can include displaying the required behavior references to a user, and can include receiving the assignment of the reference from a user. Of course, in a typical implementation, there may be several different physical objects that are referenced by a single behavior object, and the system will receive an assignment of each of these references from the behavior object to each of the appropriate physical objects. In some embodiments, this assignment can result in an id-tag correspondence between a runtime reference of an executable function of a behavior object and a runtime physical object. The physical object references in the behavior object can be assigned outside the scope of the behavior object's code.

The system stores the behavior object, the physical object, and the geometric object for the CAD object (step 914). In some embodiments, these are stored as part of a persistent object, are stored as part of the CAD model, and/or are stored as associated with the CAD model.

The system simulates an operation of the CAD model including executing he behavior object (step 916). This step, in some embodiments, can be performed by a physical simulation solver module, and can be performed in real time as a user manipulates and modifies the CAD object, and can include displaying the behavior. Executing the behavior object includes executing any executable function code, and is performed using the assigned references from the behavior object to the physical object. As part of this simulation, the behavior objects can modify the state of the physical objects to produce behavior different from that defined exclusively by the physical object.

Disclosed embodiments have a distinct advantage in the context in which it functions. In disclosed embodiments, the simulation solver runs interactively with the user and the remainder of the system. The user can manipulate the objects in the simulation directly and cause different outcomes to occur spontaneously. With this new environment, the demands of the simulation behavior are greater because a more diverse range of events can occur from the unpredictable user.

Disclosed embodiment provide an advantage in having access to the simulation solver's runtime state, and in using a two part definition of the behavior code with separate define and invoke methods. Similarly, the means for assigning the runtime object references to program variables through the define method provides distinct advantages. The way the define method causes the graphical interface of the CAD application to create reference properties provides advantages over known systems, as does the way the behavior is encapsulated in a persistent physical object as part of the simulation definition. The way that the application sets up the references for the programmed code so it does not need to search or use strings to refer to object names also improves on known systems.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully-functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for managing behavior of a CAD model, comprising:
   receiving a geometric object and corresponding physical object, for the CAD model, in a data processing system, and receiving a corresponding user annotation that specifies a simulation behavior by associating the geometric object with the corresponding physical object, wherein the physical object describes physical qualities and behaviors of the corresponding geometric object, including at least one of movement, collisions, connections, mass, velocity, or force;
   executing function code in a behavior object by the data processing system, to determine required references of the behavior object, wherein the required references indicate one or more physical objects that are required for execution of the behavior object;
   receiving and storing an assignment of at least one of the required references of the behavior object to the physical object by the data processing system;
   storing the geometric object, physical object, and behavior object in the data processing system as associated with the CAD model;
   simulating operation of at least part of the CAD model by the data processing system according to the specified simulation behavior, including executing the behavior object by the data processing system to modify a state of the physical object.

2. The method of claim 1, further comprising receiving behavior code and compiling the behavior code to produce the function code.

3. The method of claim 1, wherein the function code modifies the behavior of at least one physical object according to the assignment.

4. The method of claim 1, wherein executing the behavior object is performed by a physical simulation solver module.

5. The method of claim 1, wherein executing the behavior object is performed as a user manipulates the CAD model via an interaction with the data processing system.

6. The method of claim 1, wherein the function code is produced from user-customized behavior code that defines a behavior modification for a specified type of physical object.

7. The method of claim 1, wherein a plurality of assignments between required references and physical objects are stored.

8. A data processing system comprising a processor and accessible memory, the data processing system particularly configured to perform the steps of:
    receiving a geometric object and corresponding physical object for a CAD model, and receiving a corresponding user annotation that specifies a simulation behavior by associating the geometric object with the corresponding physical object, wherein the physical object describes physical qualities and behaviors of the corresponding geometric object, including at least one of movement, collisions, connections, mass, velocity, or force;
    executing function code in a behavior object to determine required references of the behavior object;
    receiving and storing an assignment of at least one of the required references of the behavior object to the physical object;
    storing the geometric object, physical object, and behavior object in the data processing system as associated with the CAD model;
    simulating operation of at least part of the CAD model according to the specified simulation behavior, including executing the behavior object to modify a state of the physical object.

9. The data processing system of claim 8, further configured to perform the step of receiving behavior code and compiling the behavior code to produce the function code.

10. The data processing system of claim 8, wherein the function code modifies the behavior of at least one physical object according to the assignment.

11. The data processing system of claim 8, wherein executing the behavior object is performed by a physical simulation solver module.

12. The data processing system of claim 8, wherein executing the behavior object is performed as a user manipulates the CAD model via an interaction with the data processing system.

13. The data processing system of claim 8, wherein the function code is produced from user-customized behavior code that defines a behavior modification for a specified type of physical object.

14. The data processing system of claim 8, wherein a plurality of assignments between required references and physical objects are stored.

15. A non-transitory tangible computer-readable medium encoded with computer-executable instructions that, when executed, cause a data processing system to perform the steps of:
    receiving a geometric object and corresponding physical object for a CAD model, and receiving a corresponding user annotation that specifies a simulation behavior by associating the geometric object with the corresponding physical object, wherein the physical object describes physical qualities and behaviors of the corresponding geometric object, including at least one of movement, collisions, connections, mass, velocity, or force;
    executing function code in a behavior object to determine required references of the behavior object;
    receiving and storing an assignment of at least one of the required references of the behavior object to the physical object;
    storing the geometric object, physical object, and behavior object in the data processing system as associated with the CAD model;
    simulating operation of at least part of the CAD model, including executing the behavior object to modify a state of the physical object.

16. The computer-readable medium of claim 15, further encoded with computer-executable instructions that, when executed, cause a data processing system to perform the step of receiving behavior code and compiling the behavior code to produce the function code.

17. The computer-readable medium of claim 15, wherein the function code modifies the behavior of at least one physical object according to the assignment.

18. The computer-readable medium of claim 15, wherein executing the behavior object is performed by a physical simulation solver module.

19. The computer-readable medium of claim 15, wherein executing the behavior object is performed as a user manipulates the CAD model via an interaction with the data processing system.

20. The computer-readable medium of claim 15, wherein the function code is produced from user-customized behavior code that defines a behavior modification for a specified type of physical object.

21. The computer-readable medium of claim 15, wherein a plurality of assignments between required references and physical objects are stored.

* * * * *